United States Patent [19]
Fitz et al.

[11] Patent Number: 5,202,712
[45] Date of Patent: Apr. 13, 1993

[54] CAMERA SUPPORT

[75] Inventors: Erich Fitz, Vagen; Klaus Resch, Munich, both of Fed. Rep. of Germany

[73] Assignee: HTG High Tech Geratebau GmbH, Oberhaching, Fed. Rep. of Germany

[21] Appl. No.: 760,356

[22] Filed: Sep. 16, 1991

[30] Foreign Application Priority Data

Sep. 14, 1990 [DE] Fed. Rep. of Germany ....... 4029275

[51] Int. Cl.$^5$ .............................................. G03B 29/00
[52] U.S. Cl. ...................................................... 354/81
[58] Field of Search ...................................... 354/81, 82

[56] References Cited
U.S. PATENT DOCUMENTS 4,736,217 4/1988 McDowell ............................ 354/81
5,119,203 6/1992 Hosaka et al. ....................... 354/81

Primary Examiner—Michael L. Gellner
Assistant Examiner—David M. Gray
Attorney, Agent, or Firm—Jacobson, Price, Holman & Stern

[57] ABSTRACT

A camera support in the form of a camera stand, crane, or camera car has a support column, preferably extending in the vertical direction, for the support of a camera and a leveling head (1) serving to direct the camera in the horizonal direction and being positioned between an adapter (16) located on the upper end (15) of the support column and a camera base (3). The leveling head can be connected to the camera support by a central screw (4). The leveling head (1) is swivel-mounted, relative to the adapter (16) located on the support column end (15), on a vertical swivel axis (12) which is laterally displaced relative to both the adapter axis and the axis of the leveling head to provide easy access to the central screw in the extended position.

20 Claims, 1 Drawing Sheet

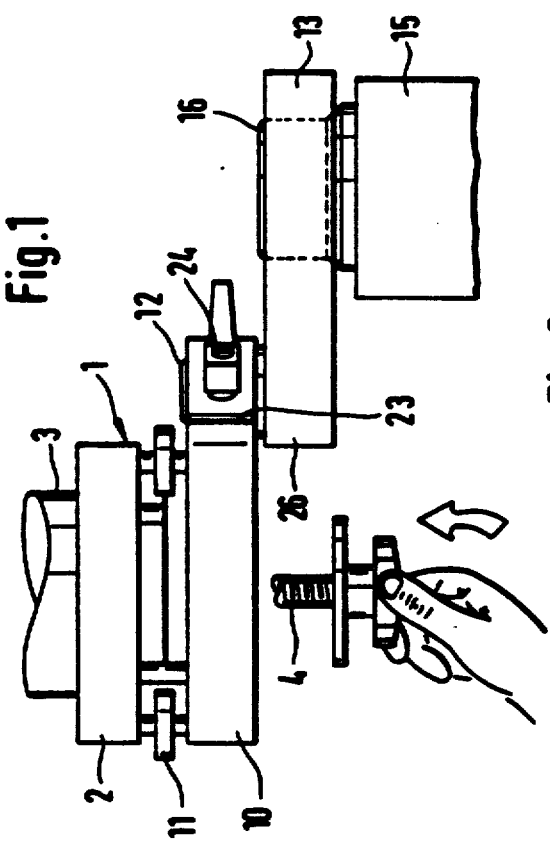

CAMERA SUPPORT

BACKGROUND OF THE INVENTION

The invention relates to a camera support in the form of a camera stand, crane, or camera car, with a support column that preferably extends in the vertical direction for the support of a camera and a leveling head that serves to direct the camera horizontally and that is positioned between the adapter on the upper end of the support column and a camera support, the leveling head being attached to the camera support by means of a central screw.

In a camera support of this type known in the prior art, a support foot having a vertical extension and that can be attached to the adapter is connected to the leveling head. The vertical extension makes it possible for the user to insert and screw in the central screw for connecting the leveling head to the camera support. The vertical extension of the support foot determines the minimal height of the camera, a height which can only be further reduced through the use of an expensive lower bracket extension.

BRIEF SUMMARY OF THE INVENTION

Applicants have discovered that a comparatively low positioning of the camera can be achieved without impeding the accessibility of the central screw if, in accordance with the invention, the leveling head is swivel-mounted relative to the adapter positioned on the end of the support column, on a vertical axis of rotation which is laterally displaced with respect to both the adapter axis and to the axis of the leveling head.

The camera support of the invention provides for positioning the leveling head immediately above the adapter, i.e., at a distance that would prohibit the user's access to the central screw for connecting the leveling head to the camera support if rotation around its vertical axis did not permit the leveling head to be moved into position in which it is laterally displaced relative to the adapter axis and in which the central screw is directly accessible to the user or can be easily screwed in.

With a camera support in which the leveling head comprises a base plate and a support plate, whose angle of incline relative to the base plate can be adjusted and which can be attached to the camera support by means of the central column, the invention provides the special expedience structurally of a vertical swivel to connect the base plate to a carrying plate which has a bearing hole for attachment to the adapter.

A structurally simple embodiment of the invention that can be easily mounted has a vertical swivel axis located between the base plate and the carrying plate provided by a pivot arm which engages with a bore provided in the other plate, and particularly a pivot arm attached to the carrying plate and projecting upwardly from the latter to engage with a pivot bore in the base plate for supporting the base plate in swivel fashion at a slight distance from the latter.

In another advantageous embodiment of the invention, the pivot arm is provided immediately above the carrying plate with a circular supporting segment of larger diameter, the axial extent of which segment determines the distance between the base plate and the carrying plate, whereby additional measures demanding further expense are unnecessary to permit the swivel action of the base plate relative to the carrying plate when the distance between the two plates is extremely small.

The carrying plate is preferably provided with a slot extending from the bearing hole for receiving the adapter to the rim of the carrying plate. The width of the slot is reduced by means of a clamping screw for clamping the carrying plate to the adapter. In this manner the carrying plate is attached in any desired position relative to the adapter and thus to the support column, which in turn determines the position of the pivot arm.

In analogous fashion, the base plate has a slot extending from the pivot bore for receiving the pivot arm on the rim of the base plate. The width of the slot can be reduced by means of a clamping screw for clamping the base plate to the pivot arm. This makes it possible to secure the carrying plate while it is in an extended position that permits the central screw to be easily screwed in, or alternatively when it is in a position in which the axis of the camera support virtually covers the axis of the adapter. In either case, employment or suppression of the swivel capability requires only a very simple manual action, specifically the manipulation of the clamping or bracing screw.

BRIEF DESCRIPTION OF THE DRAWINGS

Further details, advantages, and features will appear from the following detailed description of a preferred embodiment of the invention with reference to the accompanying drawing, to which reference is made for all features not expressly mentioned in the description and wherein:

FIG. 1 is a side elevational view of the leveling head bearing the camera support in swung out position relative to the end of the support column;

FIG. 2 is a top plan view of FIG. 1;

FIG. 3 is a side elevational view corresponding to FIG. 1, but in closed position and partly in cross-section, in which the camera support is in aligned position relative to the support column; and FIG. 4 is a top plan view of FIG. 3.

DETAILED DESCRIPTION

As can be seen from the drawing, the leveling head 1 assigned to the camera support, which may take the form of a camera car, is attached at its upper end, specifically the support plate 2, to the camera base 3 by means of a central screw 4, in a manner known to the prior art. To this end the support plate 2 includes a central opening 5 (FIG. 3), through which the central screw 4 can be screwed into a threaded bore 6 of the camera base 3. A central recess 7 adjusted to the dimensions of the support serves to center the camera base 3 relative to the support plate 2. A clamping plate 8 is provided on central screw 4, which passes through clamping plate 8. When the screw is tightened the rim area of the clamping plate 8 comes into contact with a rim area on the bottom of the central opening 5 of support plate 2. As indicated only schematically, the support plate 2 is Cardanically mounted in a known fashion to a base plate 10 by means of a swivel ring 9 and in such a way that by means of four adjustment screws 11 located in the respective corner areas the angle of incline of the support plate 2, and thus of the camera base 3, can be adjusted relative to the base plate 10, or expressed more precisely, the desired alignment of the camera on a horizonal plane is permitted independent of the angle of incline of the support column of the camera car as determined by the underlying surface on which the camera car rests.

From the drawing it can be seen that the base plate 10 is connected by means of a vertical swivel provided by a pivot 12 on a carrying plate 13, which has a bearing hole 14 to fit on the adapter 16 provided on the upper end 15 of camera car support column, which is preferably extendable in the vertical direction. The indicated vertical swivel is formed by pivot arm 12 attached to the carrying plate 13 and projecting upwardly from this carrying plate and engaging in a pivot bore 17 in base plate 10, supporting the latter in swivel fashion at a slight distance offset from the center of carrying plate 13. To this end, immediately above the carrying plate 13 the pivot arm 12 is provided with a circular support segment 18 having a comparatively greater diameter. The axial extent of this support segment 18 determines the distance between the base plate 10 and the carrying plate 13.

The carrying plate 13 has a slot 20 extending from the bearing hole 14 for receiving the adapter 16 in the rim 19 of the carrying plate. The width of the slot can be reduced by means of a clamping screw 21 for clamping carrying plate 13 on adapter 16.

The base plate 10 is provided in analogous fashion with a slot 23 extending from the pivot bore 17 for receiving the pivot arm 12 to the rim of the base plate 22. The width of slot 23 can be reduced with a clamping screw 24 for clamping the base plate 10 onto pivot arm 12.

It is evident that the distance of the camera support axis from the vertical swivel axis corresponds to the distance of the vertical swivel axis from the adapter axis. After the clamping screw 24 is unscrewed the base plate 10 can be swiveled out of the position depicted in FIG. 3 and moved 180° into the position shown in FIG. 1, in which the central screw 4 can be comfortably reached by hand and screwed into or out of the threaded bore 6. After 180° rotation into the position shown in FIG. 3, the head of the screw 4 is located immediately above base plate 10 and within the space enclosed by the swivel ring 9, so that the screw 4 is completely inaccessible. A particularly low support is thereby provided for the camera support 3 relative to the upper end 15 of the vertically extendable support column and despite the presence of the leveling head 1 between them.

The only precondition for providing the accessibility to the screw 4 explained above is that it be possible to rotate the base plate 10 around the pivot arm 12 and that the latter be located outside of the projection area of the approximately square support plate 2. For this reason both the base plate 10 and the carrying plate 13 are furnished with a lateral projection 25 and 26, respectively. The pivot arm 12 thus rests on top of the projection 26 of the carrying plate 13 and engages with the pivot bore 17 provided in the projection 25 of base plate 10.

The invention is described above using the example of a camera car. Naturally the invention can also be employed, and with equal success, for cranes and camera stands serving to support the camera when the object is to keep the camera apparatus in as low-lying a position as possible.

Should a case arise in which it is desirable to position the camera apparatus several centimeters lower, this capability is provided by removing base plate 10 from pivot arm 12, then removing the carrying plate 13 from adapter 16, inverting the carrying plate 13 so that the pivot arm projects downward, repositioning carrying plate 13 in reversed position on adapter 16, and reattaching base plate 10 on pivot arm 12 after insertion from below.

We claim:

1. Camera support for a camera stand, crane, or camera car with a support column extending substantially vertically and having an upper end for supporting a camera having a base thereon, comprising:
   adapter means on said upper end of said support column and having a substantially vertical axis;
   a leveling head engageable with said camera base and having a vertical camera mounting axis;
   screw fastening means for fastening said camera base to said leveling head on said camera mounting axis;
   swivel mounting means for mounting said leveling head on said adapter means; and
   swivel means on said swivel mounting means laterally displaced relative to both said adapter axis and said camera mounting axis and having a substantially vertical swivel axis for rotatably mounting said leveling head on said swivel mounting means so that said leveling head is laterally displaceable between a first position where said screw fastening means is substantially above said adapter means and a second extended position where said screw fastening means is laterally displaced from said adapter means.

2. Camera support as claimed in claim 1 wherein:
   said leveling head comprises a base plate, a support plate, and incline adjustment means for supporting said support plate on said base plate and adjusting the angle of inclination of said support plate relative to said base plate;
   said screw fastening means is operable for fastening said camera base to said support plate; and
   said swivel mounting means comprises a carrying plate, and a bearing hole in said carrying plate for engaging with said adapter means.

3. Camera support as claimed in claim 2 wherein:
   said swivel mounting means further comprises a pivot bore in said base plate and a diagonally projecting pivot arm on said carrying plate engaging rotatably in said pivot bore.

4. Camera support as claimed in claim 3 wherein:
   said pivot arm projects upwardly from said carrying plate and supports said base plate in spaced relation from said carrying plate.

5. Camera support as claimed in claim 4 and further comprising:
   a cylindrical spacer on said pivot arm between said carrying plate and said base plate for supporting said base plate in spaced relation to said carrying plate.

6. Camera support as claimed claim 2 and further comprising:
   a slot in said carrying plate extending from said bearing hole to an edge of said carrying plate so that the internal dimension of said bearing hole can be adjusted by varying the width of said slot; and
   clamping screw means on said carrying plate and associated with said slot for varying the width of said slot to clamp and release said carrying plate at said bearing hole on said adapter.

7. Camera support as claimed claim 3 and further comprising:

a slot in said carrying plate extending from said bearing hole to an edge of said carrying plate so that the internal dimension of said bearing hole can be adjusted by varying the width of said slot; and clamping screw means on said carrying plate and associated with said slot for varying the width of said slot to clamp and release said carrying plate at said bearing hole on said adapter.

8. Camera support as claimed claim 4 and further comprising:

a slot in said carrying plate extending from said bearing hole to an edge of said carrying plate so that the internal dimension of said bearing hole can be adjusted by varying the width of said slot; and clamping screw means on said carrying plate and associated with said slot for varying the width of said slot to clamp and release said carrying plate at said bearing hole on said adapter.

9. Camera support as claimed claim 5 and further comprising:

a slot in said carrying plate extending from said bearing hole to an edge of said carrying plate so that the internal dimension of said bearing hole can be adjusted by varying the width of said slot; and clamping screw means on said carrying plate and associated with said slot for varying the width of said slot to clamp and release said carrying plate at said bearing hole on said adapter.

10. Camera support as claimed in claim 2 and further comprising:

a second slot in said base plate extending from said pivot bore to an edge of said base plate so that the internal dimension of said pivot bore is adjustable by varying the width of said second slot; and clamping screw means on said base plate and associated with said second slot for varying the width of said second slot to clamp and release said base plate at said pivot bore on said pivot arm.

11. Camera support as claimed in claim 3 and further comprising:

a second slot in said base plate extending from said pivot bore to an edge of said base plate so that the internal dimension of said pivot bore is adjustable by varying the width of said second slot; and clamping screw means on said base plate and associated with said second slot for varying the width of said second slot to clamp and release said base plate at said pivot bore on said pivot arm.

12. Camera support as claimed in claim 4 and further comprising:

a second slot in said base plate extending from said pivot bore to an edge of said base plate so that the internal dimension of said pivot bore is adjustable by varying the width of said second slot; and clamping screw means on said base plate and associated with said second slot for varying the width of said second slot to clamp and release said base plate at said pivot bore on said pivot arm.

13. Camera support as claimed in claim 5 and further comprising:

a second slot in said base plate extending from said pivot bore to an edge of said base plate so that the internal dimension of said pivot bore is adjustable by varying the width of said second slot; and clamping screw means on said base plate and associated with said second slot for varying the width of said second slot to clamp and release said base plate at said pivot bore on said pivot arm.

14. Camera support as claimed in claim 9 and further comprising:

a second slot in said base plate extending from said pivot bore to an edge of said base plate so that the internal dimension of said pivot bore is adjustable by varying the width of said second slot; and clamping screw means on said base plate and associated with said second slot for varying the width of said second slot to clamp and release said base plate at said pivot bore on said pivot arm.

15. Camera support as claimed in claim 2 and further comprising:

a central opening in said support plate having a rim area;

a screw threaded bore in said camera base; and a clamping plate on said screw fastening means engageable with said rim area of said central opening when said screw fastening means is engaged in said screw threaded bore for fastening said camera base to said leveling head.

16. Camera support as claimed in claim 3 and further comprising:

a central opening in said support plate having a rim area;

a screw threaded bore in said camera base; and a clamping plate on said screw fastening means engageable with said rim area of said central opening when said screw fastening means is engaged in said screw threaded bore for fastening said camera base to said leveling head.

17. Camera support as claimed in claim 4 and further comprising:

a central opening in said support plate having a rim area;

a screw threaded bore in said camera base; and a clamping plate on said screw fastening means engageable with said rim area of said central opening when said screw fastening means is engaged in said screw threaded bore for fastening said camera base to said leveling head.

18. Camera support as claimed in claim 5 and further comprising:

a central opening in said support plate having a rim area;

a screw threaded bore in said camera base; and a clamping plate on said screw fastening means engageable with said rim area of said central opening when said screw fastening means is engaged in said screw threaded bore for fastening said camera base to said leveling head.

19. Camera support as claimed in claim 10 and further comprising:

a central opening in said support plate having a rim area;

a screw threaded bore in said camera base; and a clamping plate on said screw fastening means engageable with said rim area of said central opening when said screw fastening means is engaged in said screw threaded bore for fastening said camera base to said leveling head.

20. Camera support as claimed in claim 14 and further comprising:

a central opening in said support plate having a rim area;

a screw threaded bore in said camera base; and a clamping plate on said screw fastening means engageable with said rim area of said central opening when said screw fastening means is engaged in said screw threaded bore for fastening said camera base to said leveling head.

* * * * *